(12) United States Patent
Chang et al.

(10) Patent No.: US 8,034,155 B2
(45) Date of Patent: Oct. 11, 2011

(54) NANOSILVER POROUS MATERIAL PARTICLES AND FABRICATING METHOD THEREOF

(75) Inventors: Chiao-Cheng Chang, Hsinchung (TW); Austin Tsao, Hsinchung (TW)

(73) Assignee: Apex Nanotek Corporation, Hsinchung (TW)

( * ) Notice: Subject to any disclaimer, the term of this patent is extended or adjusted under 35 U.S.C. 154(b) by 553 days.

(21) Appl. No.: 12/219,168

(22) Filed: Jul. 17, 2008

(65) Prior Publication Data
US 2009/0068462 A1    Mar. 12, 2009

(30) Foreign Application Priority Data
Aug. 10, 2007 (TW) ................. 96129490 A

(51) Int. Cl.
*B22F 9/18* (2006.01)
*B22F 9/24* (2006.01)
*B32B 5/16* (2006.01)

(52) U.S. Cl. ............... 75/331; 75/343; 75/371; 75/392
(58) Field of Classification Search ............... 75/343, 75/331, 392, 371
See application file for complete search history.

(56) References Cited

U.S. PATENT DOCUMENTS

| | | | | |
|---|---|---|---|---|
| 3,374,608 | A * | 3/1968 | Manes | 95/134 |
| 6,603,038 | B1 * | 8/2003 | Hagemeyer et al. | 560/241.1 |
| 6,878,184 | B1 * | 4/2005 | Rockenberger et al. | 75/343 |
| 7,582,330 | B2 * | 9/2009 | Sahouani | 427/180 |
| 7,648,557 | B2 * | 1/2010 | Irizarry-Rivera et al. | 75/371 |
| 7,744,834 | B2 * | 6/2010 | Lee et al. | 423/23 |
| 7,825,064 | B2 * | 11/2010 | Wong et al. | 502/305 |

OTHER PUBLICATIONS

Zheng et al, "Preparation of silver nanoparticle via active template under ultrasonic", Trans. Nonferrous Met. Soc. China 16 (2006) 1348-1352.*
Cao et al, Synthesis of silver nanoparticles within ordered CMK-3 mesoporous carbon, Studies in Surface Science and Catalysis 156 (2005) 423-426.*
Nowack et al, 120 Years of Nanosilver History: Implications for Policy Makers, Environ. Sci. Technol. (2011), 45, 1177-1183.*

* cited by examiner

*Primary Examiner* — Hoa Le
(74) *Attorney, Agent, or Firm* — Rosenberg, Klein & Lee

(57) ABSTRACT

Nanosilver porous material particles and method for manufacturing the same are disclosed. The nanosilver porous material particles include nanosilver particles distributed on the surface thereof. First, a nanosilver precursor is dissolved in water and a proper quantity of a fixation agent is added to form a solution. Next, a proper quantity of the porous material particles is added into the solution and that is mixed well to form a suspension. Next, the suspension is allowed to stand for a predetermined period of time, and then the suspension is filtered to separate the porous material particles from the solution. Finally, the resulting porous material particles are baked and dried.

14 Claims, 2 Drawing Sheets

NANOSILVER POROUS MATERIAL PARTICLES AND FABRICATING METHOD THEREOF

1. FIELD OF INVENTION

This invention relates to a porous material particles, and more particularly to a nanosilver porous material particles and the manufacturing method thereof.

2. BACKGROUND OF THE RELATED ART

Activated carbon is porous and has advantages of large BET specific surface area, high adsorbability, desulfation, debenzoation, deodorization and decoloration properties. Moreover, the activated carbon can remove some specific constituents from liquid or gaseous medium.

Silver has the feature of antibacterial property. Colloidal silver, which includes tiny silver particles with diameter in a range of 10-100 nanometers, or nanosilver, developed recently, and is widely applied in many antiseptic products. For example, the colloidal silver is used as the antibacterial agent before penicillins were discovered, which can kill many kinds of microbes that are resistant to penicillins. According to recent research reports, nanosilver particles can easily attach with cell membrane or cell wall of a bacterium due to the positive charge on the surface of silver particle, and easily enter inside the bacterium and combine with the thiol (—SH) group, which is essential in aerobic metabolism. Therefore, the nanosilver can disrupt or retard the metabolism of the bacterium and inhibit the bacterium without adversely harming the host.

The combination of the activated carbon and silver particles provides the advantages of high adsorbability and high antiseptic ability, and has been used in products of many fields. The activated carbon and silver particles provides an excellent inorganic antiseptic without the problems of drug resistance. However, the silver particles used in activated carbon with silver content are not nanometric level such that the silver particles on surfaces of the activated carbon to have disadvantage of low efficient bacteriostasis. For enhancing the bacteriostasis, the silver content on the activated carbon is raised, but that also gets a side effect of polluting the environment and degrading the quality of water due to the escape of the silver on the activated carbon.

SUMMARY OF THE INVENTION

The present invention is directed to a nanosilver porous material particles and a manufacturing method thereof. First, a solution of the nanosilver precursor and a fixation agent are mixed to form a mixture. Next, a proper quantity of porous material particles is added into the mixture. The resulting suspension is allowed to stand for a predetermined period of time to allow the nanosilver precursor to adhere on the surface of the porous material particles. Finally, the suspension is filtered to separate the porous material particles from the solution and then the resulting porous material particles is baked and dried.

DETAILED DESCRIPTION OF THE INVENTION

Figure 1:
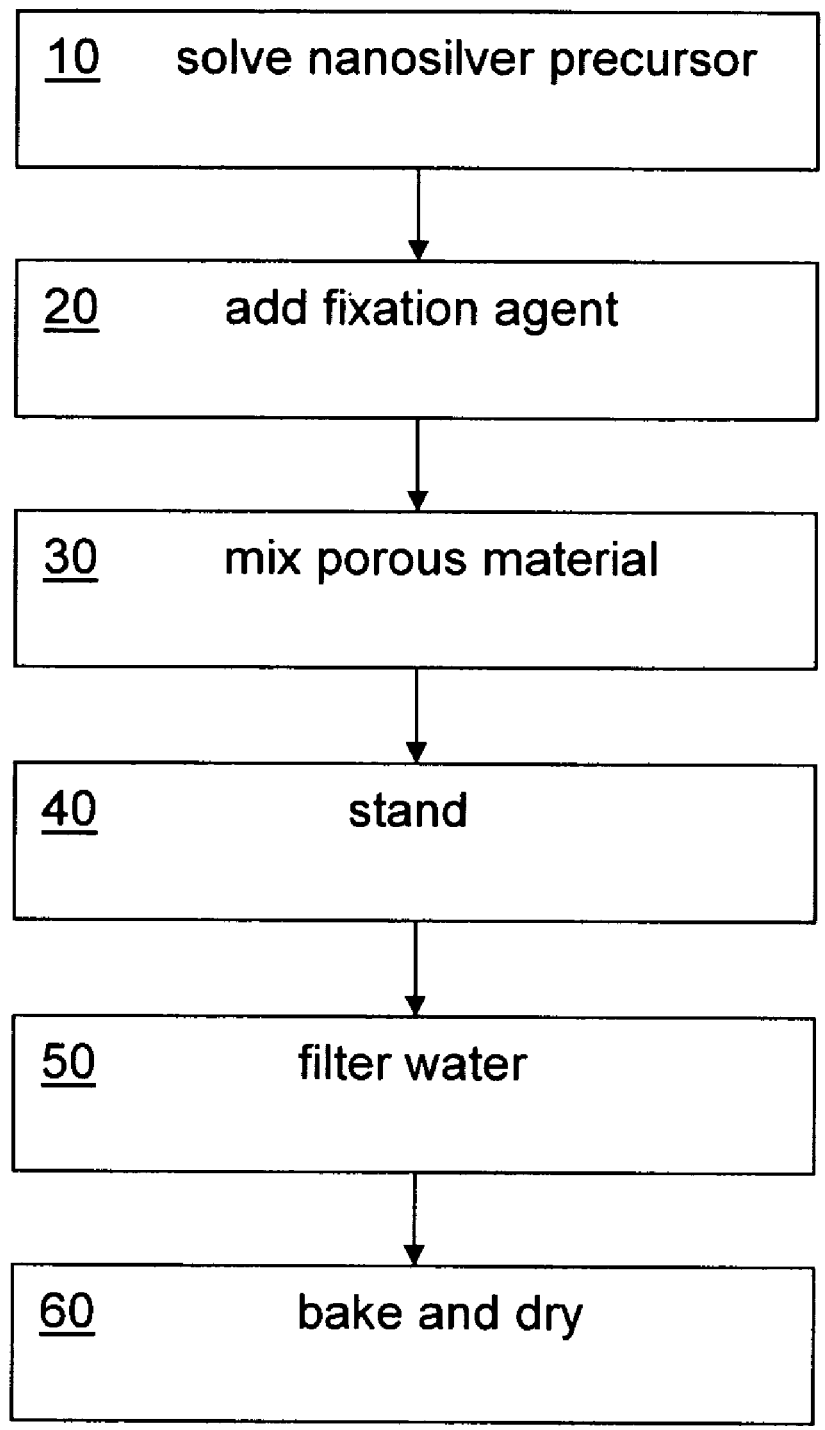
FIG. 1 is a flowchart illustrating the manufacturing method of the nanosilver porous material particles according to an embodiment of this invention.

Hereinafter, the method for manufacturing nanosilver porous material particles of this invention is described with reference to FIG. 1.

First, the nanosilver precursor is dissolved in water (step 10). Next, the fixation agent is added into the resulting solution (step 20). Next, a proper quantity of porous material particles is added into the resulting solution (step 30) and the solution is mixed well to form a homogenous suspension. Next, the suspension is allowed to stand for a predetermined duration of time (step 40). The predetermined duration of time may be in a range of 0.5 hour to 36 hours and, in the meanwhile, the nanosilver precursor will adhere on the surface of the porous material particles. The suspension is filtered to separate the porous material particles from the solution (step 50). Next, the resulting porous material particles are baked under a temperature ranging from 80° C. to 300° C. for a period of 5 to 24 hours (step 60).

In the present embodiment, examples of the nanosilver precursor include silver nitrate, silver acetate, silver lactate, silver sulfate, silver phosphate, silver fluoride, silver chloride, silver bromide, silver iodide or composites thereof. The fixation agent may include a weak acid, a weak alkali or composites thereof. Examples of the weak acid include glacial acetic acid, and the weak alkali includes ammonia water, such as the 25% ammonia water often seen commercially. Examples of the porous material particles include ceramic, activated carbon, hollow centered glass ball, solid glass ball, bamboo carbon, coconut shell carbon, charcoal, Tenax-TA, which is composed by 2,6-diphenyleneoxide, or composites thereof, wherein the activated carbon can be powder, particle-pellet, fiber, pillar-shaped particle or honeycomb-shaped particle and so on.

The better ratio of nanosilver precursor, water, fixation agent and the porous material may be optimized according to actual requirements. In an embodiment, the used weight ratio of the nanosilver precursor to the water, fixation agent, and the porous material particles ranges from 0.025% to 0.5%, from 1.25% to 25% and from 0.05% to 1%, respectively.

The nanosilver porous material particles may be used to deodorize, inhibit bacteria, adsorb gas or liquid, filter and purify gas or liquid, decolorize drug or food, preserve drug or food. Further, the nanosilver porous material particles can be applied in recovery solvent products, catalyst carrier, filter core, conditioner filter net, heater filter net, air filter net, aquarium-related components, fiber cloth, clean appliances, industrial gas protection equipment or activated carbon mask and so on.

Figure 2A:
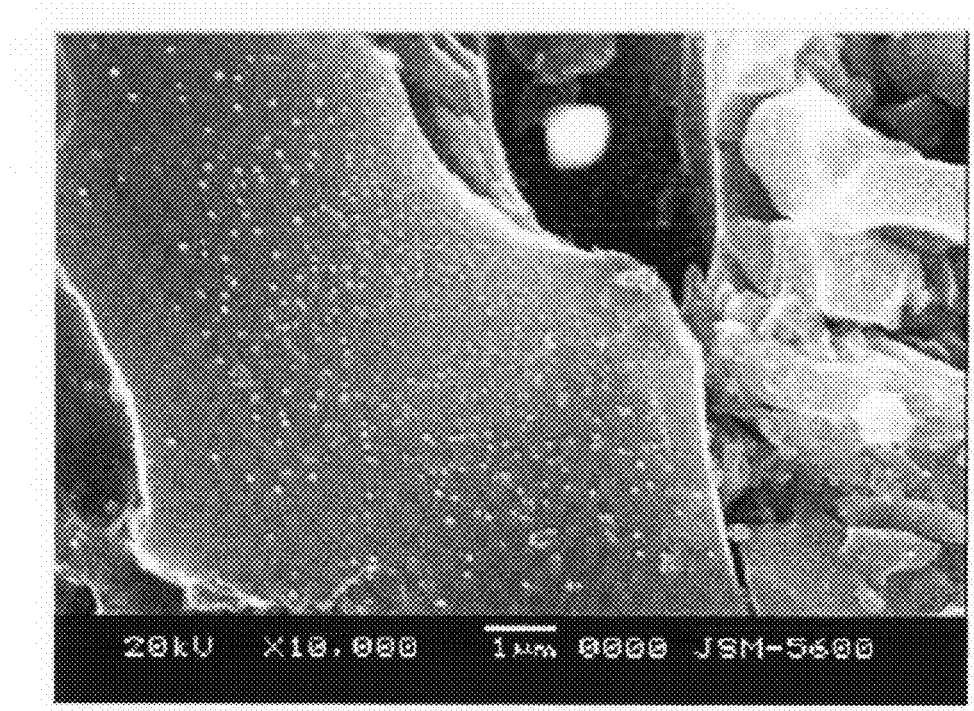
FIG. 2A is a picture of the nanosilver porous material particle captured with ×10000 magnification according to an embodiment of this invention.
Figure 2B:
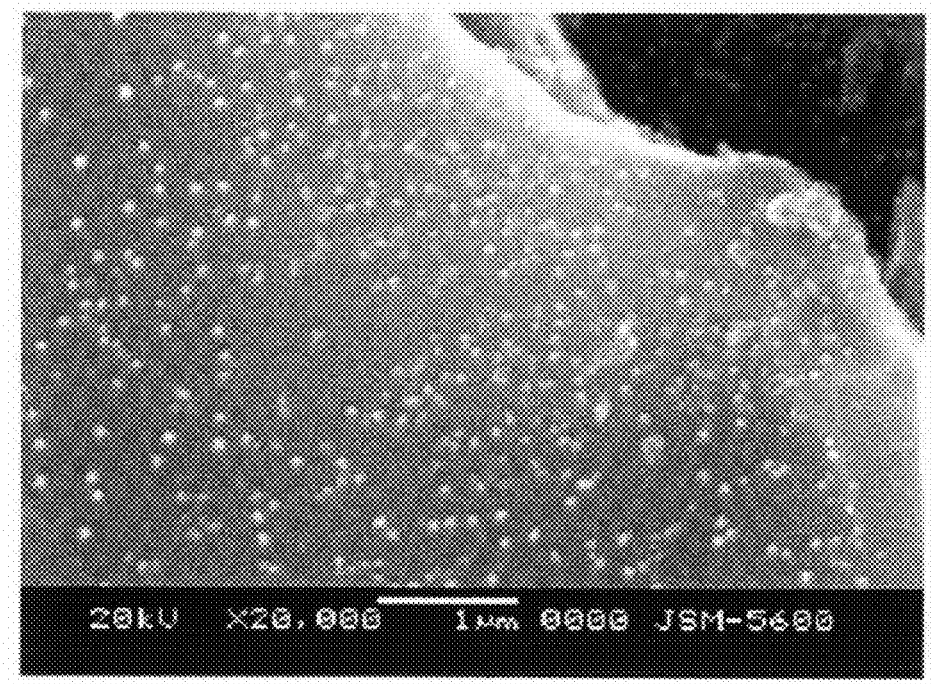
FIG. 2B is a picture of the nanosilver porous material particle captured with ×20000 magnification according to an embodiment of this invention.

FIG. 2A and FIG. 2B are pictures of the surface of the nanosilver porous activated carbon captured with 10,000 and 20,000 times magnification, respectively. In pictures, the grey background is the activated carbon, the dark parts are the tiny pores of the activated carbon, and the bright dots on the surface are the silver particles. The magnification factors are shown at the bottom of the pictures, where the bar over the 1 μm represents 1 micrometer (micrometer, $\mu m = 10^{-6}$ meter). From pictures, it can be seen that there are about 80~200 silver particles in 1 μm area, indicating that the silver particles are nanometric particles. The diameter of the silver particles is in a range from 10-999 nanometers (nanometer, nm=$10^{-9}$ meter).

Next, the adhering strength of silver particles may be tested by a method of determining the quantity of silver released from the activated carbon. Plasma-coupled atomic spectrum analyzer is used to measure the quantity of silver content in water filtered from a solution immersed the nanosilver porous activated carbon in different time intervals. The result is listed in Table 1, wherein n.d. indicates not detectable and ppm means part per million, and the detection limitation of the equipment is 0.01 ppm. The result in Table 1 shows that the filtrate of the filter equipment, filled with nanosilver porous activated carbons, does not contain detectable silver content even after the immersing period of 7 days, and that demonstrates the considerable adhesive strength of silver particles on the surface of the activated carbon.

TABLE 1

| test item | unit | the detected silver amount of the filtrate of the filter equipment with nanosilver porous activated carbons in an immersing period | | |
|---|---|---|---|---|
| | | 1 day | 3 days | 7 days |
| silver | ppm | n.d. | n.d. | n.d. |

The BET specific surface area may be tested by using an ASTM D3663-92. ASTM D3663-92 can be used to measure the surface area of activated carbon per gram ($m^2/g$). The test includes comparing the surface areas of the pure activated carbon and the nanosilver porous activated carbon to evaluate the reduction in the functionality of the activated carbon caused by the coverage of silver particles. Table 2 shows the BET specific surface area of the pure activated carbon is 926 $m^2/g$ and that of the nanosilver porous activated carbon is 895 $m^2/g$. The reduced area from the silver coverage is less than 3.5% to reveal no remarkable effect.

TABLE 2

| test item | unit | pure activated carbon | nanosilver porous activated carbon |
|---|---|---|---|
| BET specific surface area | $m^2/g$ | 926 | 895 |

Iodine adsorption is used to test the adsorbability of activated carbon for an aqueous sample. ASTM 4607 is a method to measure the adsorption of iodine per gram (mg/g) of activated carbon and nanosilver porous activated carbon. Table 3 shows iodine adsorption of pure activated carbon and nanosilver porous activated carbon are 1003 mg/g and 1040 mg/g, respectively. It is obvious that the iodine adsorption is not reduced in nanosilver porous activated carbon.

TABLE 3

| test item | unit | pure activated carbon | Nanosilver porous activated carbon |
|---|---|---|---|
| iodine | mg/g | 1003 | 1040 |

Although this invention has been explained in relation to its preferred embodiment, it should be understood that modifications and variation can be made without departing the spirit and scope of the invention as claimed.

What is claimed is:

1. A method of manufacturing nanosilver porous material particles, comprising:
    dissolving a nanosilver precursor in water and adding a fixation agent to form a mixture;
    adding a porous material into said mixture and stirring to form a suspension;
    standing said suspension for a predetermined duration of time;
    filtering said suspension to separate nanosilver porous material particles; and
    baking said nanosilver porous material particles.

2. The method of manufacturing nanosilver porous material particles according to claim 1, wherein a weight ratio of said nanosilver precursor to said water ranges from 0.025% to 0.5%.

3. The method of manufacturing nanosilver porous material particles according to claim 1, wherein a weight ratio of said nanosilver precursor to said fixation agent ranges from 1.25% to 25%.

4. The method of manufacturing nanosilver porous material particles according to claim 1, wherein a weight ratio of said nanosilver precursor to said porous material ranges from 0.05% to 1%.

5. The method of manufacturing nanosilver porous material particles according to claim 1, wherein said nanosilver precursor is selected from the group consisting of silver nitrate, silver acetate, silver lactate, silver sulfate, silver phosphate, silver fluoride, silver chloride, silver bromide, silver iodide and a composite thereof.

6. The method of manufacturing nanosilver porous material particles according to claim 1, wherein said fixation agent includes a weak acid, a weak alkali or a composite thereof.

7. The method of manufacturing nanosilver porous material particles according to claim 6, wherein said weak acid includes glacial acetic acid.

8. The method of manufacturing nanosilver porous material particles according to claim 6, wherein said weak alkali includes ammonia water.

9. The method of manufacturing nanosilver porous material particles according to claim 1, wherein said fixation agent composite includes a mixture of glacial acetic acid and ammonia water.

10. The method of manufacturing nanosilver porous material particles according to claim 1, wherein said predetermined duration of time ranges from 0.5 hour to 36 hours.

11. The method of manufacturing nanosilver porous material particles according to claim 1, wherein the step of baking is performed at a temperature in a range of 80 to 300° C.

12. The method of manufacturing nanosilver porous material particles according to claim 1, wherein the step of baking is performed for a duration of 5 to 24 hours.

13. The method of manufacturing nanosilver porous material particles according to claim 1, wherein said porous material is selected from the group consisting of ceramic, activated carbon, hollow centered glass ball, solid glass ball, bamboo carbon, coconut shell carbon, charcoal, Tenax-TA, which is composed by 2,6-diphenyleneoxide, and a composite thereof.

14. The method of manufacturing nanosilver porous material particles according to claim 13, wherein said activated carbon includes powder, particle-pellets, fibers, pillar-shaped or honeycomb-shaped particles.

* * * * *